United States Patent [19]

Goode

[11] Patent Number: 5,313,830
[45] Date of Patent: May 24, 1994

[54] ASSESSMENT OF AIR INGRESS TO STEAM SYSTEMS

[75] Inventor: Charles H. Goode, Horsham, United Kingdom

[73] Assignee: Furness Controls Limited, East Sussex, England

[21] Appl. No.: 946,874

[22] Filed: Sep. 17, 1992

[30] Foreign Application Priority Data

Sep. 18, 1991 [GB] United Kingdom ............ 9119949

[51] Int. Cl.$^5$ .................... G01F 1/46; G01F 15/00
[52] U.S. Cl. ................................. 73/198; 73/861.65
[58] Field of Search ........... 73/861.55, 861.56, 861.04, 73/861.02, 198, 196; 165/11.1

[56] References Cited

U.S. PATENT DOCUMENTS 4,420,969 12/1983 Saum ................................ 73/198
4,594,888 6/1986 DeBaun et al. .................... 73/198

Primary Examiner—Richard E. Chilcot, Jr.
Assistant Examiner—Harshad Patel
Attorney, Agent, or Firm—Robert F. O'Connell

[57] ABSTRACT

The specification discloses an apparatus for assessing the ingress of air into a steam system which includes a steam condenser having an exit, a vacuum pump arrangement for maintaining the exit under a partial vacuum, and pipework connecting the exit to the vacuum pump arrangement. A pitot probe is positioned at a first monitoring point in the pipework to sense the total dynamic and static pressure of the entire flow in that pipework. A second probe is positioned at a second monitoring point which is displaced from the first monitoring point and adjacent the exit from the condenser, to sense the static pressure and temperature at that second monitoring point. An indication of the amount of air flowing past said first monitoring point is derived from the total pressure, the static pressure and the temperature, which are measured at the first and second monitoring points.

8 Claims, 5 Drawing Sheets

ASSESSMENT OF AIR INGRESS TO STEAM SYSTEMS

FIELD OF THE INVENTION

This invention relates to the assessment of air ingress into steam systems, particularly steam operated power generating plants.

BACKGROUND OF THE INVENTION

In the generation of power from steam, particularly but not exclusively electrical power, it is common practice to use a steam turbine supplied with superheated steam from a boiler system. Downstream at the turbine, a condenser system is provided to condense the steam; and in order to achieve the optimum efficiency of the system, it is conventional to maintain the condenser system under a vacuum so that the maximum pressure drop is achieved across the turbine, are so that the system is devoid of air. Vacuum pumps are conventionally provided to extract the air from the system on start up, and to maintain that situation.

However, in any practical system, leaks arise with the result that air gets into the system, causing a loss of efficiency. If the ingress of air can be satisfactorily monitored, and as a result maintained at a minimum, for instance by locating and repairing any leaks which allow the air to enter the system, then the overall efficiency of the plant can be improved and maintained.

Systems for monitoring the ingress of air into such a system have been proposed in which a monitoring point is established in the final pipework from the condenser system to the air pump arrangement used to extract air from the system. Such monitoring systems have relied on the measurement of the velocity of the total flow in such pipework, together with the absolute pressure and the temperature at the monitoring point. From the temperature of the flow, it is possible to establish the vapour pressure of the steam present in the gas, and by deducting this from the absolute pressure, to determine the ratio of steam to air present in the gas. This ratio, together with the total flow through the pipework, can give an assessment of the amount of air being extracted from a system at a given time, and thus of the amount of air that must be leaking into the system.

Such previous monitoring arrangement shave suffered from errors, and have proved unreliable in practice.

It is an object of the present invention to provide an improved monitoring arrangement for assessing the ingress of air into a steam system.

SUMMARY OF THE INVENTION

Accordingly, the present invention provides apparatus for assessing the ingress of air into a steam system comprising at least a steam condenser and a vacuum pump system to maintain the exit of the condenser under a partial vacuum, comprising a pilot probe positioned at a first monitoring point in pipework to the pump system which carries the flow from the condenser to the pump system and arranged to sense the total of the dynamic and static pressure of the flow at that point; and a second probe positioned adjacent the exit from the condenser and arranged to sense the absolute or static pressure and the temperature of the flow at that point.

Where there are several exits from the condenser system, such a second probe is preferably provided for each such exit and the outputs from the plurality of second probes averaged.

Preferably each such second probe is placed no more than ten times the diameter of the exit piping from the exit of the condenser and preferably no more than four times that diameter from the exit.

BRIEF DESCRIPTION OF THE DRAWINGS

In order to promote a fuller understanding of the above and other aspects of the present invention, some embodiments will now be described, by way of example only, with reference to FIGS. 4 and 5 of the accompanying drawings in which.

DETAILED DESCRIPTION OF THE INVENTION

Figure 1:
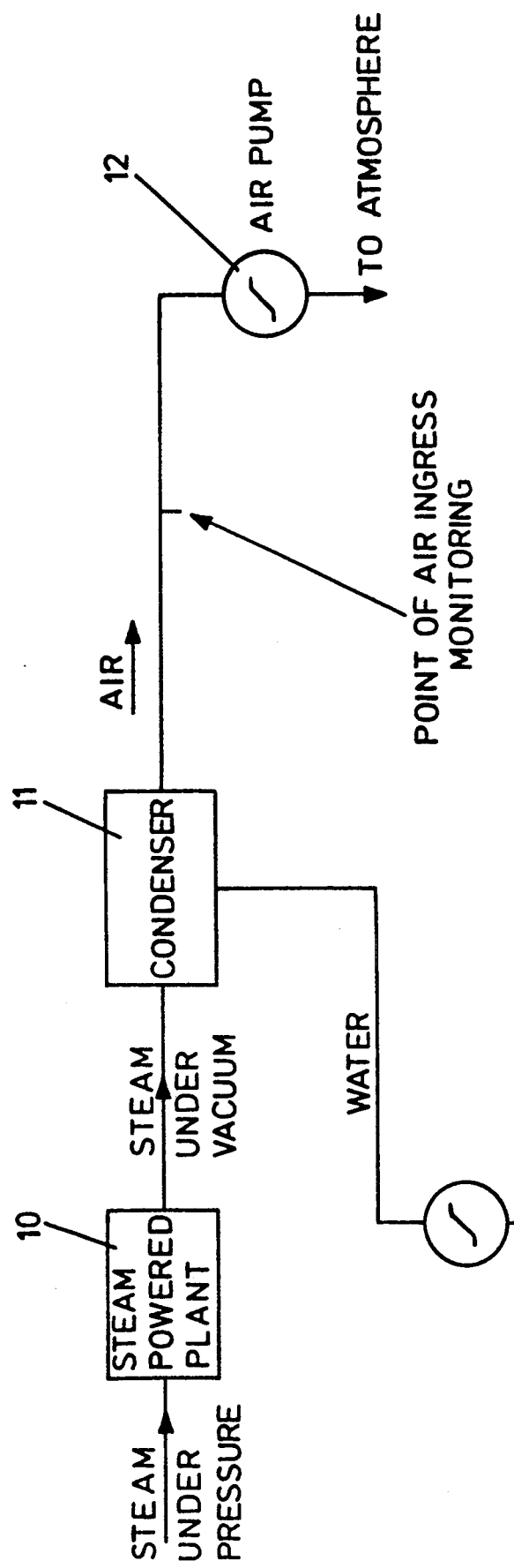
FIG. 1 shows a schematic arrangement of an air ingress monitoring system.
Figure 2:
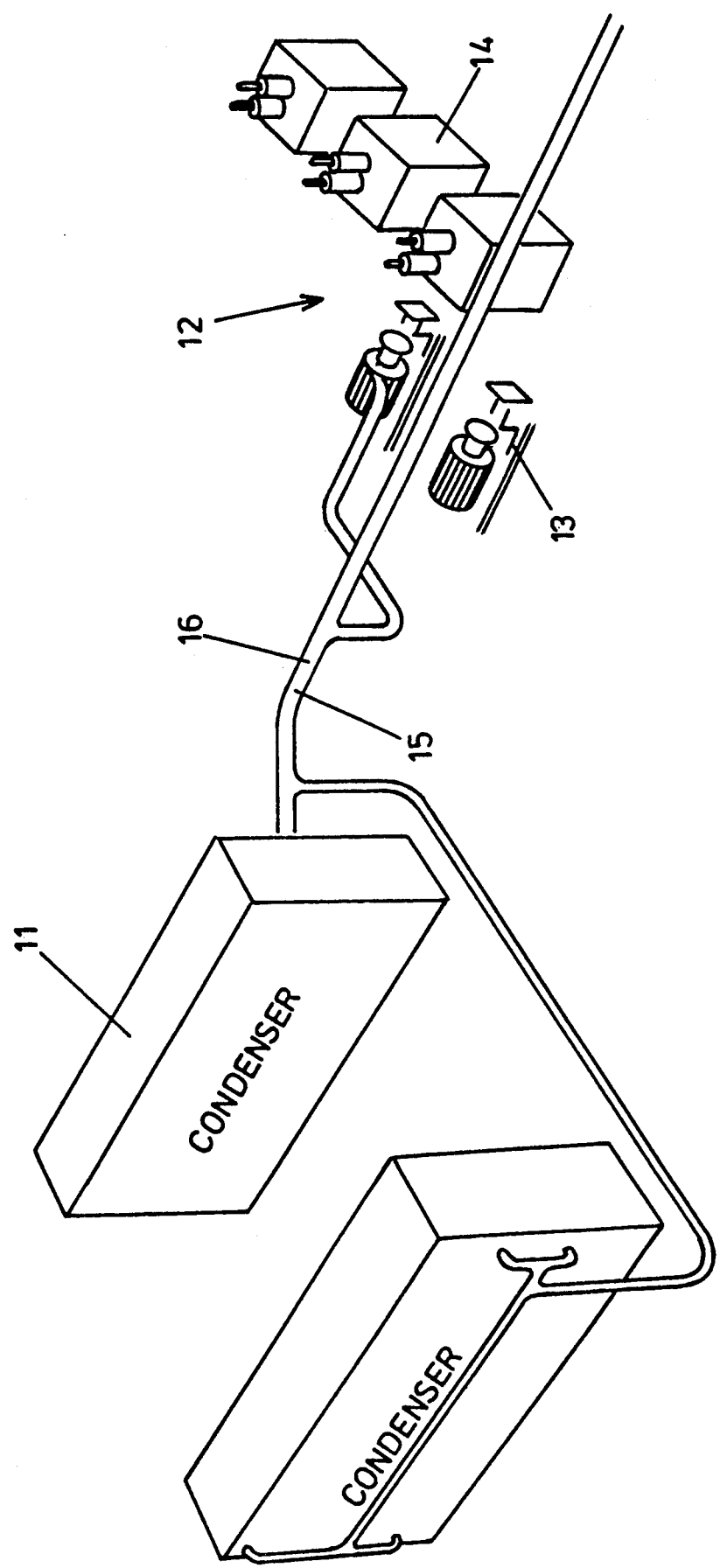
FIG. 2 shows a schematic arrangement of that part of a steam plant to which the monitoring system of FIG. 1 is applied.

FIGS. 1 and 2 show in schematic form the arrangement of a steam system with a monitoring point for measuring the ingress of air into the system. Steam from a steam power generating apparatus such as a steam turbine indicated at (10) is passed to a steam condenser (11) which is maintained under a partial vacuum by a pump system indicated generally at (12). The pump system (12) includes start up pumps (13) used for extracting air initially from the system at start up, and main air pumps indicated at (14) used to maintain the condenser system under partial vacuum. The pipework from the condenser system (11) to the pumps (12) involves many branches, and terminates in a single run of piping indicated at (15). It will be appreciated that the mass flow through the pipework used to monitor the ingress of air, must be measured in the single run of pipework (15) between the condense arrangement (11) and the pump arrangement (12) Otherwise a leak, in a branch of the pipework omitted from the monitoring, would not be detected. Thus it has been conventional to monitor the total flow, absolute pressure and temperature of the flow in the pipe (15) at a point indicated typically at (16).

Figure 3:
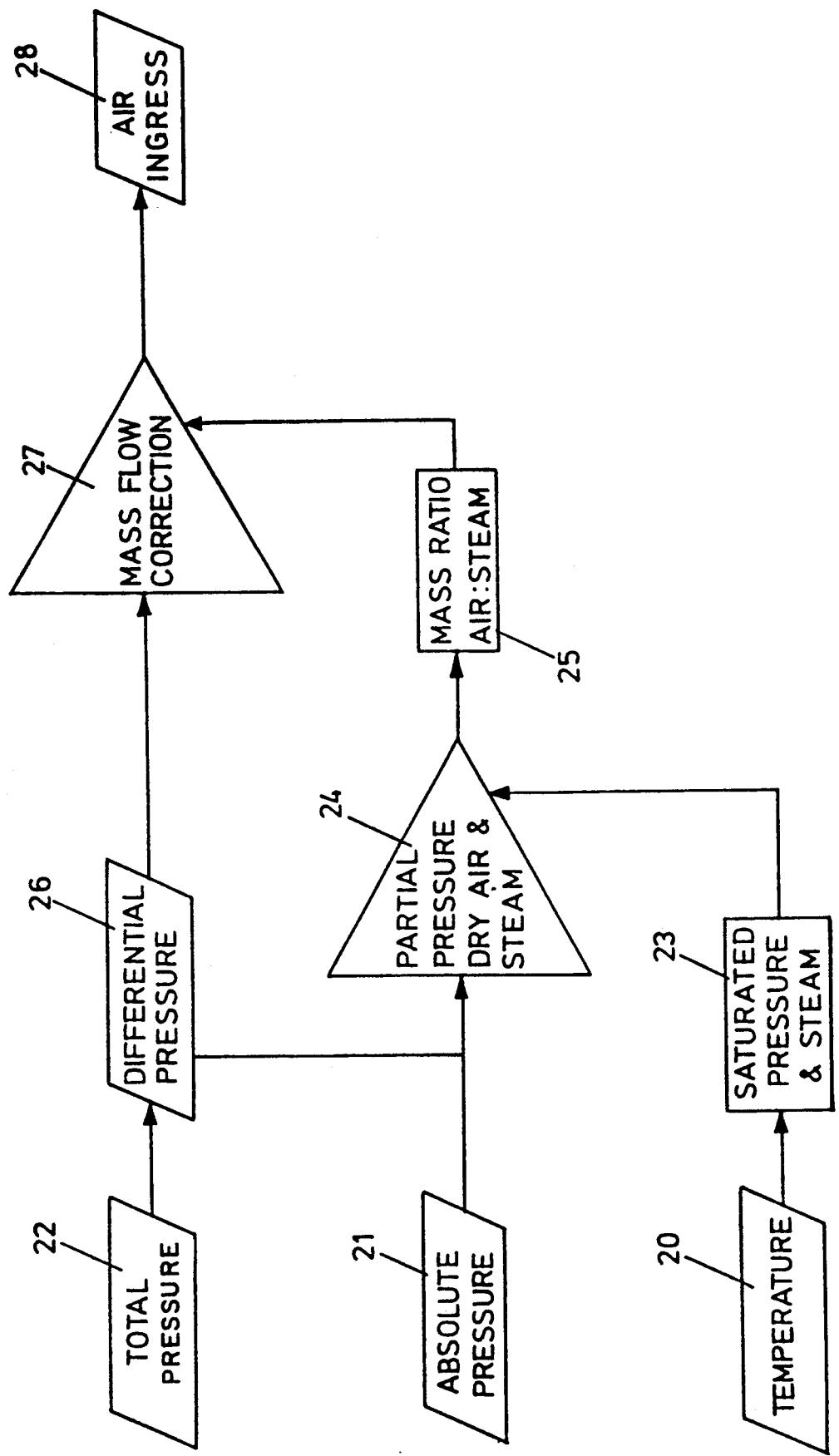
FIG. 3 shows a schematic flow diagram of the calculation of air ingress.

FIG. 3 shows a schematic flow diagram of how the rate of air ingress may be calculated in such an arrangement. At the detection point (16), the temperature of the flow is measured as indicated at (20). With a suitable detector probe giving an electrical output signal, the absolute pressure or status pressure of the flow is measured as indicated at (21) with a suitable detector probe giving an electrical output signal, and the total pressure including dynamic and static pressure from the flow is measured as indicated at (22) with a suitable pilot tube probe giving an electrical output signal.

From the temperature signal, by application of a suitable algorithm, or by application to the steam tables in known manner per se, the saturated vapour pressure applicable to the temperature, and thus to the steam present at the detection point (16), may be determined as indicated at (23). If this saturated vapour pressure is then compared, as indicated at (24) with the absolute pressure, the mass ratio of air to steam in the flow may be determined as indicated at (25). At the same time, the total mass flow may be determined as indicated at (26), from the difference between the total pressure including the dynamic pressure and static pressure from the pilot tube, and the absolute pressure or static pressure alone. This may be corrected by the air/steam mass flow ratio as indicated at (27) to give effectively the amount of air flowing at the point (16) in the system, and thus in effect the air ingress to the system, as indicated at (28).

This arrangement vias been subject to considerable errors in operation, and in some instances can even give a negative air ingress figure due to these errors. It has been determined, that a primary source of such errors has arisen because of change in temperature of the gas flow between the exit from the condenser system (11) and the monitoring point (16), arising from the fact that the ambient temperature in the building containing such a steam plant is often different to the temperature at the exit from the condenser system. This means that at the point (16), the steam content of the flow is no longer calculable accurately from, the steam tables or algorithms using the arrangement of FIG. 3. This has lead to errors.

In order to overcome this error, in the present invention the measurement of the mass flow, is separated from the measurement of the temperature and absolute pressure; and the measurement of temperature and absolute pressure is made immediately downstream of the exit from the condenser system (11).

Figure 4:
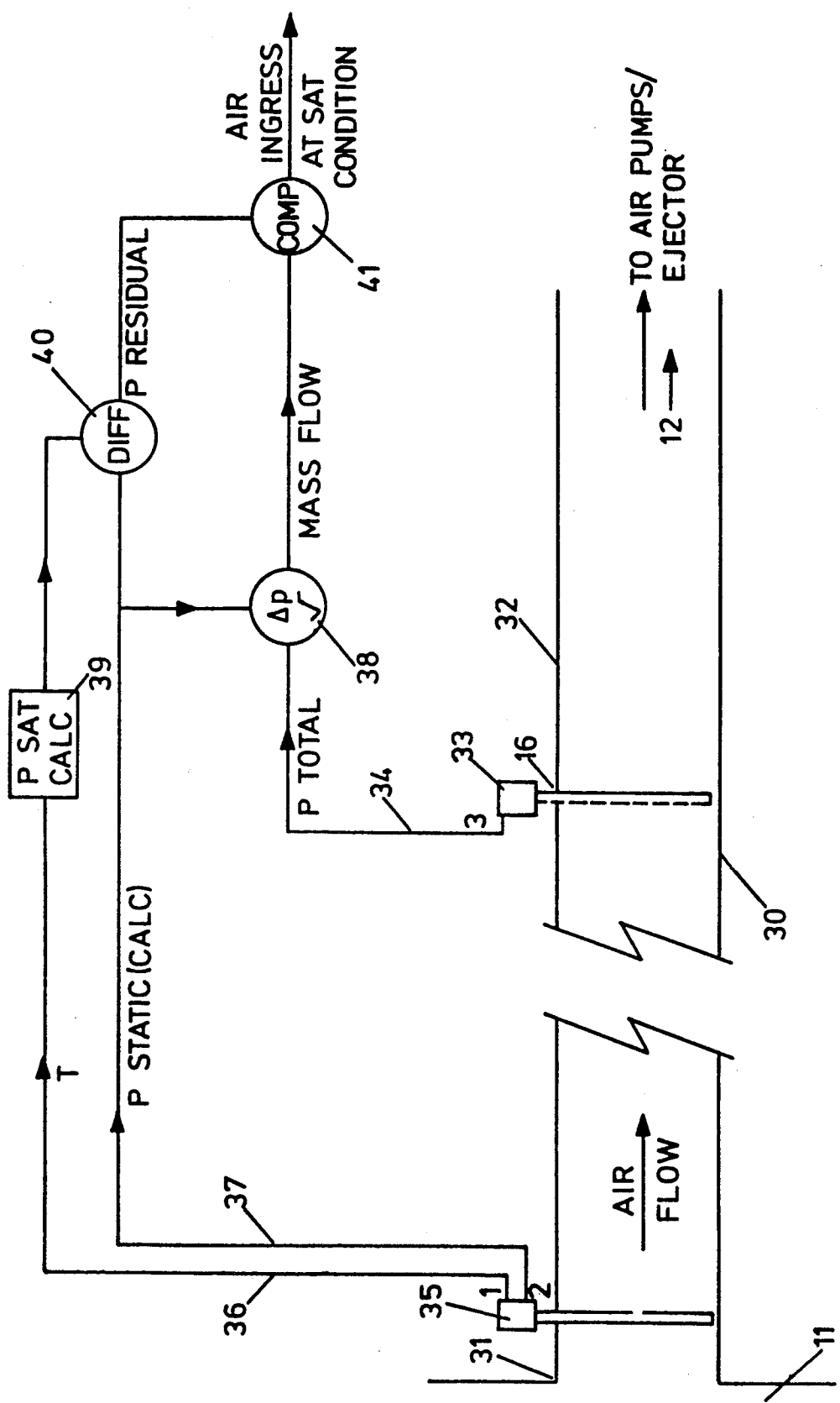
FIG. 4 shows a schematic diagram of a first embodiment of the present invention.

FIG. 4 shows a first embodiment of the invention in schematic form. The pipework from the condenser system (11) to the vacuum pump system (12) is indicated generally at (30). The exit from the condenser system (11) is indicated at (31), and the final run of pipe to the vacuum pump system is indicated at (32). A pitot tube (33) is provided in the final pipe section (32) at the monitoring point (16) to measure the total pressure, that is to say the dynamic pressure and static pressure, to provide for the calculation of mass flow through the pipe section (32). A probe (35) is provided immediately adjacent the condenser exit (31) to measure the temperature of the flow at that point, to give an electrical signal output on a line (36); and to measure the absolute pressure, that is to say the static pressure, at that point, to give an electrical output signal on a line (37). With this arrangement the measurement of temperature and absolute pressure is made at a point where the steam is still saturated, thus substantially eliminating the errors discussed above.

The derivation of air ingress is generally similar to that discussed with reference to FIG. 3, in that the mass flow is derived at (38) from the total pressure and the absolute or static pressure; the vapour pressure is derived at (39) from the temperature measurement; and the residual or air pressure is derived at (40) from the static pressure measured at probe (35) and the vapour pressure derived at (39). Thus at (41), the air flow past the monitoring point can be established and consequently the air ingress to the system.

The calculation and derivation of various factors in the arrangement of FIG. 4 is achieved by electronic computer means in conventional manner per se operating on the various electrical signals.

In the arrangement of FIG. 4, only a single exit (31) is shown for the condenser system, (11). In practice the condenser system (11) has a number of exits, and in a preferred arrangement a probe such as that shown at (35) is provided at each exit, and the outputs from the probes (35) are averaged before being used in the calculations discussed above. In a preferred arrangement, the temperature is measured in the probe (35) with a platinum resistance thermometer, and where a number of probes are used, these resistances are connected to derive an average output. The absolute pressure measurements can also be similarly averaged.

Figure 5:
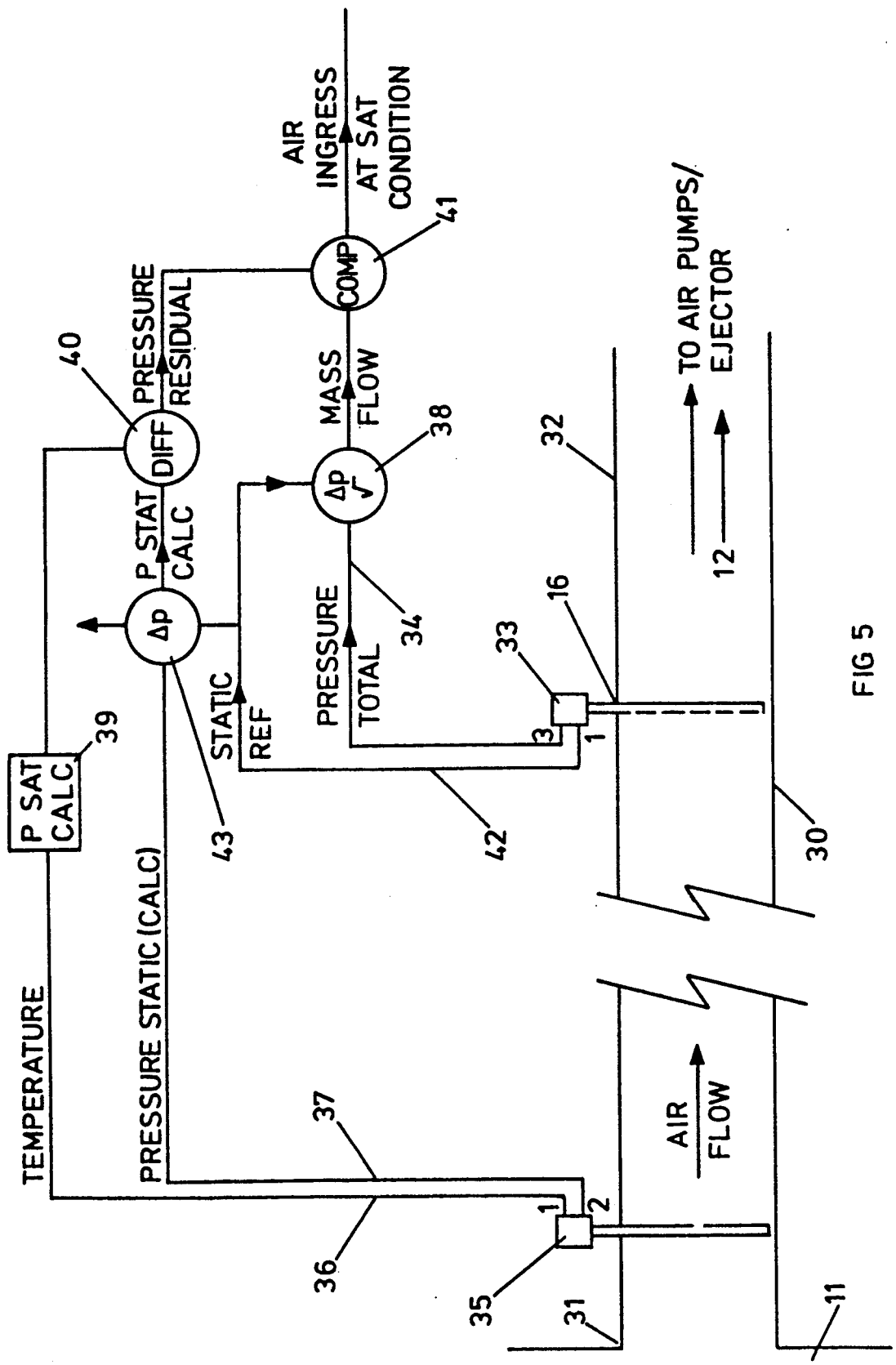
FIG. 5 shows a schematic diagram of a second embodiment of the present invention.

FIG. 5 shows a second embodiment of the invention, and where parts have the same purpose or function as in the arrangement of FIG. 4, they are given the same reference numbers.

In the arrangement of FIG. 5, an additional step is taken to improve the accuracy of the system. It will be noted that in FIG. 4, the mass flow is calculated from a dynamic pressure measured at the monitoring point (16) and a static pressure measured at a point considerably upstream of the monitoring point. There is inevitably a pressure drop due to the flow through the pipework, and this introduces an error in the mass flow indication. In the embodiment of FIG. 5, the pilot tube (33) at the monitoring point (16) is provided with additional means to measure the local static pressure to give an output on the line (42) and this is used at (38) in conjunction with the total pressure signal on the line (34) to provide the mass flow. The calculation of the pressure of the air at (40) is carried out in an exactly similar manner between the signals on the lines (36) and (37) from the probe (35) immediately adjacent the condenser exit (31).

As an additional feature, a comparison between the static pressure measured at the probe (35), and the st at i c pressure measured at the probe (33), may be made as indicated at (43) to give a saturated or super heat indication in respect of the air flow at the point (16).

The probes (35), as mentioned above, are provided immediately adjacent the exits (31) of the condenser system (11). In order to achieve the optimum results, the probe (35) should be mounted at a point not exceeding 10 times the diameter of the duct in which they are mounted, from the actual exit of the condenser system (11). Preferably, such distance does not exceed 4 times the diameter of the pipe.

The arrangements of FIGS. 4 and 5 give a considerable improvement in accuracy of measurement of air ingress, enabling the achievement of considerably greater efficiency of operation of a steam plant of this nature, by enabling the detection and correction of air leaks.

While, in this specification and claims, reference is made to static pressure, the skilled reader will understand that equally a base pressure which may be measured having a known ratio to the so called static or absolute pressure may be used in the derivation of the various parameters discussed. The specification and claims should be interpreted with that in mind.

What is claimed is:

1. Apparatus for assessing the ingress of air into a steam system which comprises at least a steam condenser having an exit, a vacuum pump arrangement for maintaining the exit under a partial vacuum, and pipework connecting the exit to the vacuum pump arrangement, the apparatus comprising a pitot probe positioned at a first monitoring point in said pipework past which the flow from the condenser to said vacuum pump arrangement passes, the pitot probe including means for sensing the total of the dynamic and static pressure of that entire flow;

a second probe positioned at a second monitoring point adjacent said exit from the condenser, the second probe sensing the static pressure and temperature at said second monitoring point; and derivation means for deriving an indication of the amount of air flowing past said first monitoring point from said total pressure, and the static pressure and temperature at said second monitoring point.

2. Apparatus as claimed in claim 1, for use with such a steam system in which said condenser has a plurality of exits, in which a respective second probe is provided for each such exit, the outputs from said respective second probes providing the static pressure and the temperature at each of said exits.

3. Apparatus as claimed in claim 1, in which said second monitoring point in said pipework is at a distance of; no more than ten times the diameter of the pipework from the exit.

4. Apparatus as claimed in claim 1, in which said second monitoring point in said pipework is at a distance of no more than four times the diameter of the pipework from the exit.

5. Apparatus as claimed in claim 1, in which said derivation means comprises:

means for deriving the saturated vapour pressure of steam present at said second monitoring point, from the temperature sensed at said second monitoring point;

means for deriving the ratio of steam to air present at said second monitoring point by comparing said saturated vapour pressure with the static pressure sensed at said second monitoring point;

means for deriving the total mass flow through the system by comparing the total dynamic and static pressure at said first monitoring point with the static pressure sensed at said second monitoring point; and means for deriving the amount of air flowing in the system from said ratio of steam air and said total mass flow.

6. Apparatus as claimed in claim 1, in which said pitot probe further includes means for sensing the static pressure at said first monitoring point.

7. Apparatus as claimed in claim 5, in which said derivation means comprises:

means for deriving the saturated vapour pressure of steam present at said second monitoring point, from the temperature sensed at said second monitoring point;

means for deriving the ratio of steam to air present at said second monitoring point by comparing said saturated vapor pressure with the static pressure sensed at said second monitoring point;

means for subtracting the static pressure sensed at said first monitoring point from the total of the dynamic and static pressure sensed at said first monitoring point and for deriving therefrom the total mass flow through the system; and means for deriving the amount of air flowing in the system from said ratio of steam air and said total mass flow.

8. Apparatus as claimed in claim 7, in which said derivation means includes:

means for comparing the static pressures sensed at said first and second monitoring points to give an indication of whether the steam is superheated or saturated at said first monitoring point.

* * * * *